(12) United States Patent
Damola et al.

(10) Patent No.: US 9,059,944 B2
(45) Date of Patent: Jun. 16, 2015

(54) METHOD AND ARRANGEMENT FOR ENABLING SERVICE DELIVERY IN A TELECOMMUNICATIONS NETWORK

(75) Inventors: Ayodele Damola, Solna (SE); Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 265 days.

(21) Appl. No.: 13/881,538

(22) PCT Filed: Nov. 25, 2010

(86) PCT No.: PCT/SE2010/051304
§ 371 (c)(1),
(2), (4) Date: Apr. 25, 2013

(87) PCT Pub. No.: WO2012/070993
PCT Pub. Date: May 31, 2012

(65) Prior Publication Data
US 2013/0227137 A1    Aug. 29, 2013

(51) Int. Cl.
*G06F 15/16* (2006.01)
*H04L 12/911* (2013.01)
*G06F 9/50* (2006.01)
*H04L 29/08* (2006.01)

(52) U.S. Cl.
CPC .............. *H04L 47/78* (2013.01); *G06F 9/5072* (2013.01); *H04L 67/16* (2013.01)

(58) Field of Classification Search
USPC ............... 709/224, 226, 219; 726/7; 370/468, 370/252; 705/34
See application file for complete search history.

(56) References Cited

U.S. PATENT DOCUMENTS

2006/0047802 A1    3/2006  Iszlai et al.
2008/0080552 A1*   4/2008  Gates et al. .................. 370/468
(Continued)

FOREIGN PATENT DOCUMENTS

WO    WO 2010/058215 A1    5/2010

OTHER PUBLICATIONS

International Search Report, PCT Application No. PCT/SE2010/051304 Aug. 31, 2011.
(Continued)

*Primary Examiner* — Kyung H Shin
(74) *Attorney, Agent, or Firm* — Myers Bigel Sibley & Sajovec, P.A.

(57) ABSTRACT

A method and arrangement for enabling delivery of an IT-service to a client, wherein execution of the IT-service requires resources in a cloud architecture. First, a plurality of predefined cloud computing services and respective requirements for resources, are registered. Then, service subscriptions and associated subscription identities, valid in a telecommunications network, are provisioned for the predefined cloud computing services. One of the service subscriptions and associated subscription identity is assigned to an identity module, for enabling delivery of the IT-service to the client by providing an associated predefined cloud computing service when the client uses the identity module. Then, activity of the assigned service subscription is monitored in the network based on the associated subscription identity, and resources are allocated in the cloud architecture according to the assigned service subscription, when it is detected that the assigned service subscription is activated or has been activated.

20 Claims, 3 Drawing Sheets

(56) References Cited

U.S. PATENT DOCUMENTS

| | | |
|---|---|---|
| 2009/0300152 A1 | 12/2009 | Ferris |
| 2010/0042720 A1 | 2/2010 | Stienhans et al. |
| 2010/0192212 A1* | 7/2010 | Raleigh .............................. 726/7 |
| 2010/0217865 A1 | 8/2010 | Ferris |
| 2011/0093567 A1* | 4/2011 | Jeon et al. ..................... 709/219 |
| 2012/0005051 A1* | 1/2012 | Deng et al. ...................... 705/34 |

OTHER PUBLICATIONS

Written Opinion of the International Searching Authority, PCT Application No. PCT/SE2010/051304, Aug. 26, 2011.

* cited by examiner

METHOD AND ARRANGEMENT FOR ENABLING SERVICE DELIVERY IN A TELECOMMUNICATIONS NETWORK

CROSS REFERENCE TO RELATED APPLICATION

This application is a 35 U.S.C. §371 national stage application of PCT International Application No. PCT/SE2010/051304, filed on 25 Nov. 2010, the disclosure and content of which is incorporated by reference herein in its entirety. The above-referenced PCT International Application was published in the English language as International Publication No. WO 2012/070993 A1 on 31 May 2012.

TECHNICAL FIELD

The invention relates generally to a method and arrangement for enabling delivery of a range of services to clients by utilizing resources in a cloud architecture.

BACKGROUND

The concept of "cloud computing" has been established in recent years as a technology for delivering services to clients in need of IT-related functionality, e.g. involving various operations for processing and storing data. This development is driven by the need for efficient use of low-cost CPUs (Central Processing Units) for virtualized execution of services, allowing several applications to be executed in the same CPU which is much more efficient than execute each application in a separate or dedicated physical CPU.

The clients may be associated with any enterprises, companies, organizations, private persons, etc. In this description, a client can essentially be regarded as a communicating computer or the equivalent. Basically, the owner of a client does not have to invest in expensive hardware equipment, operative systems and software functionality together with administration, to provide for the needs in terms of IT functionality, but can instead hire resources, e.g. as hardware infrastructure and platforms, from a provider of cloud computing services, hereafter referred to as "cloud computing provider" for short.

Typically, cloud computing services can be consumed and utilized for a preset time period, and the hiring party, e.g. an enterprise or organization, can basically rely on any amount of resources at any time during the period of hiring as required, while the cloud computing service is fully managed by the cloud computing provider. Significant developments in virtualization and distributed computing, as well as improved access to high-speed Internet and generally greater cost-awareness, have enabled and strengthened the interest for cloud computing.

Figure 1:
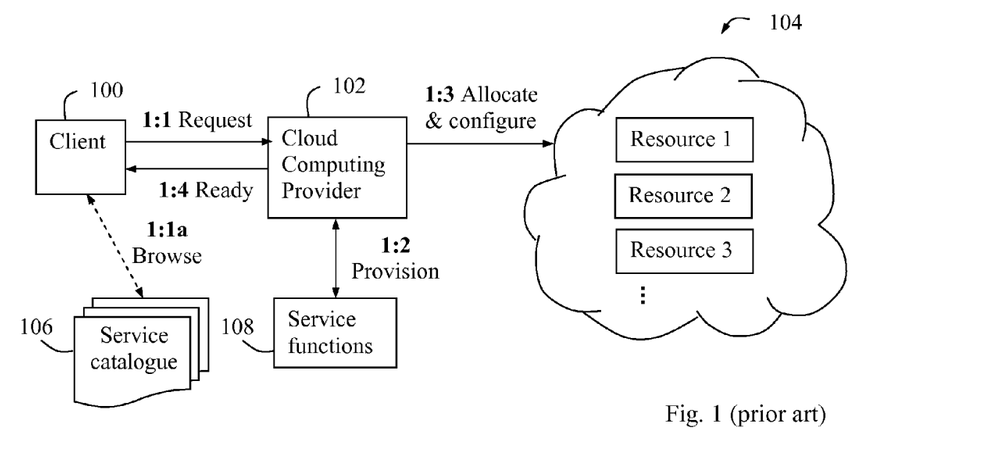
FIG. 1 is a block diagram illustrating a typical example of providing cloud computing services, according to the prior art.

FIG. 1 is a simplified and schematic illustration of how cloud computing services may be utilized by a client 100. A cloud computing provider 102 has control of a set of resources in a cloud 104, which basically may include hardware equipment, basic software with capabilities for processing and storing tasks, and software functionality, e.g. processors, computers, servers, memories, data storages, operative systems, software product, etc. These resources can be configured to perform various cloud computing services for a great number of clients, and it is assumed that the capacity of the cloud is more or less unlimited, at least from the individual clients' viewpoint. The cloud computing services can then be used as means for executing various IT services when delivered to a client. In this description, the term "resource" is used to generally represent any such hardware equipment and software including operative systems, which can be used for enabling the cloud computing services and IT services.

In an action 1:1, the client 100 makes a request to the cloud computing provider 102 for a specific cloud computing service, possibly after browsing, in action 1:1a, a catalogue 106 of available predefined cloud computing service functions. Alternatively, the client may request to create a customized cloud computing service that is specifically adapted and configured to satisfy the needs of that particular client 100, which inevitably will require some amount of manual work for defining and configuring various functions for the cloud computing service. A next action 1:2 illustrates that the requested cloud computing service is basically provisioned for the client, which thus may involve a certain amount of manual work for defining functions for a new customized cloud computing service in the set of service functions 108.

The cloud computing provider 102 then allocates, i.e. reserves, and configures resources in the cloud 104 needed to realize the requested cloud computing service, in an action 1:3. The resource allocation in the cloud 104 is typically time-limited such that the cloud computing service and reserved resources can be utilized by the client 100, but not by others, for a preset period of time, after which the resources are released and can be used by other cloud computing services and clients. Other limitations may also be imposed for the cloud computing service, e.g. in terms of bandwidth, capacity and data amounts.

Once the proper resources have been allocated in the cloud 104, some kind of acknowledgement may be sent to the client, in an action 1:4, to confirm that the cloud computing service is ready for use. As said above, FIG. 1 is greatly simplified and the shown cloud computing provider node 102 may comprise various functions and entities for managing cloud computing services, client requests and resources, such as: a user interface, an entity for maintenance of a cloud computing service catalogue or the like, an entity for management of available resources in the cloud 104, an entity for resource allocation and configuration, an entity for monitoring and metering resource usage, and so forth.

In order to create an IT-service, a corresponding IT-application must be installed/configured/started in the cloud computing environment, comprising the cloud computing provider's resources, by the cloud computing provider. This work is typically supported by an IT-administrative department or the like at the enterprise/organization, or by an external IT-service provider if the enterprise/organization is outsourcing its entire IT-support to a third party.

As mentioned above, defining and configuring a new customized IT-service for a specific enterprise typically requires a significant amount of manual work, thus making such customized IT-services quite expensive to employ. Manual configuration work may also be required for establishing useful transport connections between the cloud computing provider and the clients, such as leased lines, transport VPNs (Virtual Private Networks) or IP-sec tunnels. As a result, it is only feasible to provide customized IT-services to relatively large enterprises able to afford it.

It is thus a problem that customized, and thereby virtually optimal, IT-services are affordable only to relatively large enterprises due to the amount of manual work required, and that more cost-limited "smaller" enterprises, not affording such customized services, sometimes referred to as SOHOs (Small office Home Office), must be content with support by standard IT-environment providing rudimentary predefined services like telephony, internet access, and storage. The latter enterprises may further be unable to provide the competence and knowledge required for supporting the process of customizing and providing the IT-services. The current cloud architectures are thus too inflexible to provide an affordable and virtual optimal IT-service for said "smaller" enterprises due to the amount of manual work required, particularly for cost-sensitive small and medium-sized enterprises.

Thus, the amount of IT-services that can support the smaller enterprises is quite limited in the solutions of today. The cloud architectures of today may be sufficient to provide customized services for a small number of large enterprises, but they are insufficient for meeting specific demands of a large number of small and medium-sized enterprises, users or groups of users.

Another problem relates to capacity in that the utilization of resources in a cloud can be rather inefficient since the resources in the cloud are continually being reserved to a hiring client, thus not being available for others, even though the allocated resources may be left unused for extensive lengths of time during the hiring period. Therefore, the cloud computing provider must host a much greater amount of resources than actually being required for use at the same time. Unreasonable capacity would be required in the cloud computing service to provide dedicated resources for a large number of IT-services at the same time.

SUMMARY

It is an object of the invention to address at least some of the problems and issues outlined above. It is also an object to create a mechanism for providing resources to enable delivery of IT-services to clients with improved efficiency and/or flexibility. It is possible to achieve these objects and others by using a method and an arrangement as defined in the attached independent claims.

According to one aspect, a method is provided for enabling delivery of an IT-service to a client, wherein execution of the IT-service requires resources in a cloud architecture. In this method, a plurality of predefined cloud computing services and their respective requirements for resources in the cloud architecture, are registered. Further, service subscriptions and associated subscription identities are provisioned for the predefined cloud computing services, which service subscriptions and subscription identities are valid in a telecommunications network. One of the service subscriptions and associated subscription identity is assigned to an identity module, for enabling delivery of the IT-service to the client by providing an associated predefined cloud computing service when the client uses the identity module.

Activity of the assigned service subscription is then monitored in the telecommunications network based on the associated subscription identity, and resources are allocated in the cloud architecture according to the assigned service subscription, when it is detected that the assigned service subscription is activated or that it has been activated. As a result, resources will be allocated in the cloud only when usage of the cloud computing service can be expected such that only a fraction of the total number of subscribing clients and cloud computing services will be served with resources at the same time. The resources in the cloud architecture will thus be utilized more efficiently. It will also be relatively simple to subscribe to a cloud computing service by purchasing an identity module, and to automatically obtain the needed resources. Further possible benefits will be explained later below.

According to another aspect, an arrangement is provided in a service enabler configured to enable delivery of an IT-service to a client, wherein execution of the IT-service requires resources in a cloud architecture. According to this arrangement, the service enabler comprises a service unit adapted to register a plurality of predefined cloud computing services and their respective requirements for resources in the cloud architecture. The service enabler also comprises a subscription unit adapted to provision service subscriptions and associated subscription identities for the predefined cloud computing services, which service subscriptions and subscription identities are valid in a telecommunications network. The subscription unit is further adapted to assign one of the service subscriptions and associated subscription identity to an identity module for enabling delivery of the IT-service to the client by providing an associated predefined cloud computing service when the client uses the identity module.

The service enabler also comprises a monitoring unit adapted to monitor activity of the assigned service subscription in the telecommunications network based on the associated subscription identity. The service unit is further adapted to allocate resources in the cloud architecture according to the assigned service subscription when it is detected that the assigned service subscription is activated or that it has been activated.

The above method and arrangement may be configured and implemented according to different embodiments. In a possible embodiment, when the activity of the assigned service subscription is monitored, it may be detected that the service subscription is activated when the client, using the identity module, connects to the telecommunications network. If the client is a mobile terminal, the activation of the service subscription may be detected when the mobile terminal activates a primary PDP (Packet Data Protocol) context or is attached to the telecommunications network.

In further possible embodiments, the identity module may be any of a SIM (Subscriber Identity Module) card, soft SIM, USIM (UMTS SIM), ISIM (IMS SIM), VSIM (Virtual SIM), MCIM (Machine Communication Identity Module), smart card, and encryption circuit, adapted for installation in the client, while corresponding subscriber data is maintained in a subscription database of the telecommunications network. If the telecommunications network is a mobile network, the identity module may be a SIM card for use in mobile terminals, and the subscription database may be an HLR (Home Location Register) or an HSS (Home Subscriber Server) of the mobile network.

In another optional embodiment, allocating the resources may include identifying the cloud computing service connected to the service subscription assigned to the identity module, and determining resource requirements of the identified cloud computing service. It is also possible that the assigned service subscription is an aggregated subscription and the identity module is installed in a mobile broadband router or a fixed wireless terminal associated with a set of clients, thereby allowing the set of clients to utilise the provided cloud computing service.

In another optional embodiment, when it is detected that the service subscription is de-activated, the processing may be interrupted and the allocated resources in the cloud architecture can be released. If the assigned service subscription is a pre-paid service subscription, the provided cloud computing service may be suspended when it is detected that a pre-paid amount for the service subscription has been spent, and the cloud computing service may then be resumed when a new amount has been paid for the service subscription. Thereby, the resources will be allocated no more than necessary also for a pre-paid subscription.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided for making more efficient use of a set of resources in a cloud architecture when employed for providing cloud computing services to clients for enabling IT-services. The cloud computing services and required resources in the cloud are managed and provided to various clients by means of an IT-service enabling entity, hereafter referred to as "service enabler", comprising functional unit or the like adapted to execute the different actions described below. A plurality of specific cloud computing services are first predefined which may be suitable for usage to a range of client users in different fields and domains, such as private companies, organizations, retailers, dealers, economy department, administrators, stock keepers, private persons, just to mention a few possible examples.

Defining a cloud computing service includes specifying what resources are required for executing the service, e.g. in terms of processor and/or memory capacity, sometimes also involving basic software and functions. Other requirements in the service definition may refer to various network parameters, delay, jitter, bandwidth, etc. The cloud computing service definitions including required resources may be stored in a database at the service enabler as service descriptions in a suitable data structure containing information on the service requirements, e.g. as exemplified above. A substantial amount of such cloud computing services may be defined in advance to cover the needs of multiple potential IT-service consumers.

Then, service subscriptions and associated subscription identities are provisioned for the predefined cloud computing services, and in the solution described herein one of these subscriptions is assigned to an identity module, which can be supplied and installed in a client, thereby enabling an IT service that can be realized by the cloud computing service of the subscription. The service subscriptions and subscription identities are valid in a telecommunications network, e.g. a mobile network, and a service subscription and corresponding identity can thus be assigned to an identity module, e.g. a physical SIM (Subscriber Identity Module) card or other module defined by software and/or hardware such as soft SIM, USIM (UMTS SIM), ISIM (IMS SIM), VSIM (Virtual SIM) or MCIM (Machine Communication Identity Module), smart card, encryption circuit, for installation in a client. A service subscription may also be assigned to an identity module that can be supplied to a set of clients allowed to utilize the corresponding cloud computing service, particularly when the identity module is installed in a mobile broadband router or a fixed wireless terminal associated with the set of clients, thereby forming an aggregated service subscription.

After assigning a subscription and associated identity to the identity module which is supplied to a client, the client's activity in the network is monitored based on the subscription identity assigned to the identity module, and when the subscription is detected to be activated in the network, the resources required for the corresponding cloud computing service are allocated and activated in the cloud architecture based on the subscription identity. In this context, it should be noted that detecting that the subscription is activated should be interpreted as either detecting the actual process of activation or detecting that the subscription has been activated, i.e. after the actual activation.

This way, the necessary resources will be occupied and exclusively available for use to the client only when the subscription is activated, i.e. when the client can be expected to actually use the cloud computing service, but not when the subscription is detected to be inactive thus releasing the allocation and stopping the use of any resources by the client. The resources in the cloud can thus be utilized more efficiently and less resources in the cloud architecture will remain unused at any time. It is also possible to offer a greater range of predefined cloud computing services and less costly service subscriptions, which will potentially attract small and medium-sized enterprises or groups of users, since only a fraction of the available cloud computing services will be active at the same time when the described solution is used for the clients.

When this description refers to "resources" in the cloud, it should be understood that the resources may comprise a variety of different equipments and functions involving software, and the invention is not limited in this respect. Some further terms used in this description are defined as follows.

The term "client" is used to represent a terminal or computer equipment associated with any user, party or customer that consumes IT services requiring resources and cloud computing services from the cloud architecture, while "terminal" is used to represent, without limitation, any type of user equipment, often also referred to as UE for short, capable of communicating in the manner described here. Some examples of terminals are: mobile phone, PC (Personal Computer), laptop, server connected to a LAN (Local Area Network), etc. It is further assumed that an identity module can be installed in the client. As explained above, the identity module may be implemented as a combination of hardware and software, e.g. a SIM card, or as software only, e.g. a soft SIM.

"Subscription" refers to any type of subscription for a cloud computing service requiring processing and storing resources. The subscription may be paid for continuously with regular payments, billed with flat rate or per use (time, volume, etc.), or pre-paid either for unlimited use during a set time period or for a limited use (time, volume, etc.). In the case of pre-paid, the subscription time or other limitation can thus be extended by further payment.

"Activation of subscription" can be detected when the terminal associated with the client is powered on and is attached to the telecommunications network, and the identity module, e.g. SIM card or soft SIM, installed therein is registered in the network as being activated. Correspondingly, de-activation of the subscription may be detected when the terminal is powered off. Alternatively, the subscription may be detected as activated when the client sends a command for a specific application associated with the subscription, which may then be de-activated e.g. after a preset time out period has elapsed after the latest application command or when the client closes the application.

"Allocating resources" basically means that any resources necessary for delivering the service, e.g. CPU, memory, and/or software/functions, are reserved in the cloud for use by the client if this refers to exclusively dedicated resources or shared resources by multiplexing is outside the scope of this solution.

Figure 2:
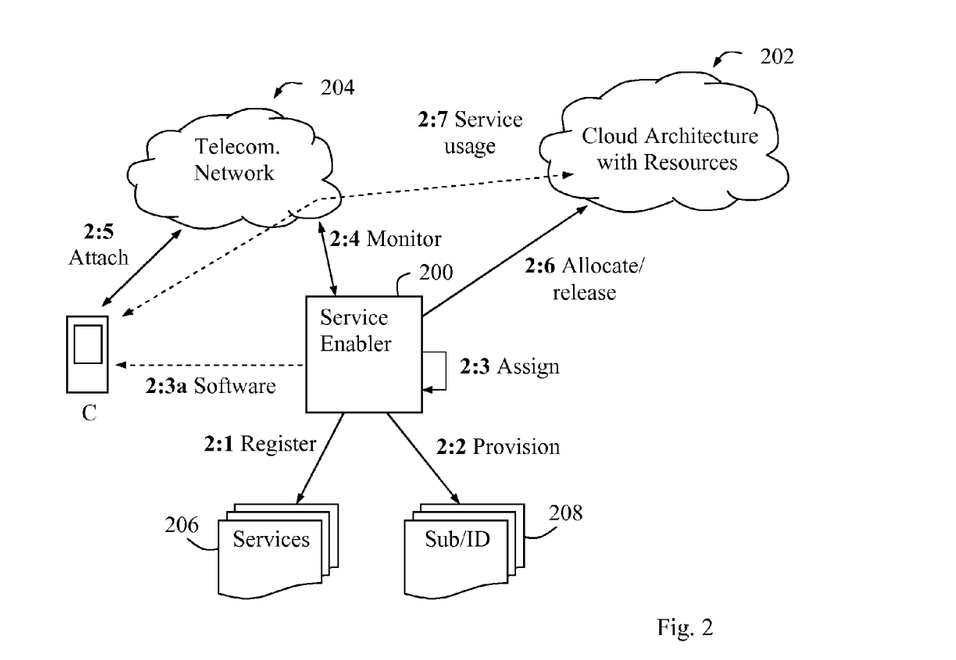
FIG. 2 is a block diagram illustrating a procedure and arrangement for enabling delivery of an IT-service to a client, according to an example embodiment

An exemplary procedure for enabling delivery of an IT-service to a client or group of clients in a telecommunications network, will now be described with reference to FIG. 2 in which a service enabler 200 is configured to perform different actions in this procedure. It is assumed that execution of the IT-service requires a cloud computing service involving some amount of processing and/or storage resources which can be hired from a cloud architecture with resources 202. The client is represented in the figure by a mobile terminal C that can be connected to a telecommunications network 204, in this case a mobile network, although this procedure is not limited in this respect by serving a mobile terminal in a mobile network or any other particular type of terminal or network. To generalize, the telecommunications network 204 and the mobile terminal C will be called "network" and "client", respectively, in the following.

Depending on the business model, the network 204, the service enabler 200 and the cloud architecture with resources 202 may have three separate owners, or the network 204 and the service enabler 200 can have the same owner, and any other combinations are also possible. The service enabler 200 thus technically enables delivery of IT-services to the client C by allocating, i.e. hiring, resources in the cloud 202 when a service subscription assigned to an identity module installed in the client is detected as active. Further, the actual service provider delivering the IT-service may be another party, such as an independent party or the network operator, not shown in this figure as it is somewhat outside the scope of the solution described herein which solution is directed to technical features for enabling delivery of the IT-service.

The shown procedure basically comprises a configuration phase and a run-time phase. In the configuration phase, service subscriptions are provisioned for certain predefined cloud computing services, and one of the subscriptions is assigned to an identity module which is supplied to the client, while in the run-time phase, activation of the client's subscription is detected and resources are allocated in the cloud for enabling the IT-service delivery. Of course, more than one of the predefined cloud computing services can be covered by the identity module used by the client, and in this description, "a cloud computing service" implies at least one cloud computing service.

A first action 2:1 illustrates that the service enabler 200 registers a plurality of cloud computing services 206 requiring if functionality such as processing and storage of data. The cloud computing services 206 are defined to serve the specific needs of different users for enabling an IT-service by means of resources in the cloud 202. For example, cloud computing services can be defined and specifically adapted for different categories of enterprises such as different professions and fields of practice, e.g. as exemplified above. An assortment of cloud computing services 206 may be built up and expanded over an extended period of time, e.g. on a continuous basis. This solution actually enables a greater range of such predefined cloud computing services as compared to the limitations of previous solutions, which will be described further below.

Also in action 2:1, the requirements for resources in the cloud architecture 202, needed for executing the predefined cloud computing services 206, are registered together with the service definitions. As mentioned above, these requirements may refer to processor and/or memory capacity, functionality, network parameters, delay, jitter, bandwidth, QoS (Quality of Service), etc. In some cases, the requirements may change during execution of the cloud computing service, and the registered requirements for resources in the cloud architecture may refer to some representative amount or type of resources such as an expected average or maximum amount, and the invention is not limited in this respect.

Registering the predefined cloud computing services 206 in action 2:1 may include storing the service definitions, including service identifiers and required resources, as records in a suitable data storage accessible for the service enabler 200, which may also be referred to as "cloud computing service descriptions". The service descriptions may further include references to software and configuration file repositories being preloaded in the service enabler 200. For example, a useful service description record may comprise a service code (i.e. identifier), a set of primitives referring to requirements of the cloud computing service, pointers to configuration files such as scripts which automatically configure the cloud resources for the service, and pointers to any software files needed to execute the cloud computing service.

In a further action 2:2, the service enabler 200 provisions service subscriptions and associated subscription identities 208 for the predefined cloud computing services, which service subscriptions and subscription identities are valid in the network 204. For example, the service subscriptions and associated subscription identities may be defined according to standards or protocols prevailing in the network 204. For example, subscriber data corresponding to the subscriptions is maintained in a subscription database of the telecommunications network, such as an HLR (Home Location Register) in the case of a mobile network, or an HSS (Home Subscriber Server). As described above, the subscription identity, and thereby also its respective associated service subscription, can be implemented in an identity module, e.g. exemplified above, for installation in the client.

The provisioned service subscriptions and associated subscription identities 208, as well as identifiers of which predefined cloud computing services are covered by the respective subscriptions, may likewise be stored as records in a suitable data storage accessible for the service enabler 200. Although the cloud computing services 206 and the subscription identities 208 are schematically illustrated as separate data sets in the figure, this information may be arranged in any suitable manner, e.g. in a single data storage, and the invention is not limited to any specific way of maintaining and organizing the information on predefined cloud computing services and subscriptions.

Then, the service enabler 200 assigns one of the predefined service subscriptions and associated subscription identity to an identity module, in a following action 2:3, for enabling delivery of the IT-service to the client when the client has the identity module installed. An optional action 2:3a illustrates that the service enabler 200 may send one or more software applications to the client, if needed for using the identity module and corresponding cloud computing service, e.g. an updated version of a previously used application or similar.

As indicated above, the identity module is at some point installed in the client terminal. For example, a user associated with the client may have purchased the identity module and corresponding cloud computing service from a service provider or retailer, not shown, which may be an independent party or the operator of network 204. The user may simply buy a SIM, or multiple SIMs for multiple terminals, with a corresponding predefined service subscription and associated subscription identity and install the identity module in the client terminal, thereby authorizing the client to activate and use the covered cloud computing service which enables the IT-service. The actual operation of how the user acquires the identity module from a service provider or retailer is out of scope of this invention.

At this point, the client C has a service subscription and an associated subscription identity installed as the identity module in the client terminal, e.g. in the form of a SIM card or similar. Action 2:3, and 2:3a if executed, basically completes the configuration phase of this procedure. As indicated above, the service subscription assigned to the identity module may be an aggregated subscription valid for a set of clients allowed to utilize the provided cloud computing service, e.g. when the clients are associated with an enterprise with multiple employees or members and when the identity module is installed in a mobile broadband router or a fixed wireless terminal. The users may of course also use multiple terminals, each having an identity module installed for usage of the cloud computing service.

In a further action 2:4, effectively beginning the run-time phase, the service subscription associated with client C is monitored in the network 204, using a suitable interface between the service enabler 200 and the network 204, to detect activity or non-activity of the subscription typically triggered by the client. This action is preferably performed on a more or less continuous basis. Initially, that is before the client has activated the service subscription at all, the subscription is deemed to be inactive and no resources need to be allocated in the cloud architecture 202 for the client at this point since no use of the cloud computing service covered by the subscription is anticipated.

Once the client activates the service subscription, as shown in an action 2:5, e.g. when the terminal associated with the client is powered on and the terminal is attached to the network, or when a primary PDP (Packet Data Protocol) context is established in the network for the powered on terminal in the case of a mobile system, the activation state of the subscription switches from inactive to active implying that the client may now start to use the cloud computing service at any time. Thereby, resources are needed in the cloud architecture 202 for processing and executing the cloud computing service. Activation of the service subscription can be detected in different ways, depending on the type of telecommunications network. One example mentioned above is to detect that a primary PDP context is established in a mobile network, or generally that a communication link is established for the terminal. A primary PDP context basically means that a default radio bearer is established, e.g. for carrying signaling messages. Another example is detecting that the client issues an application command associated with the service subscription or corresponding cloud computing service.

In response to the subscription activation in result of action 2:5, the service enabler 200 allocates resources in the cloud architecture 202 required for executing the cloud computing service, in a following action 2:6, according to the service subscription when detecting that it has been activated. In this action, the service enabler 200 checks the detected activated subscription and the service description of the corresponding cloud computing service 206, e.g. based on a service identifier of the subscription present in the subscription identities 208, in order to determine what type and amount of resources are required for executing the cloud computing service, and to allocate resources in the cloud accordingly. In this action, another suitable interface is used between the service enabler 200 and the cloud architecture 202. A last shown action 2:7 illustrates that the client C uses the cloud computing service by means of the allocated resources in the cloud 202, thus enabling the IT-service.

Thereby, resources will be available for the client C when really needed for the IT-service but not otherwise, making much more efficient use of the resources by not being exclusively reserved more than necessary. As a result, it is possible to register a greater selection of predefined cloud computing services, as of action 2:1, since a given amount of resources in the cloud 202 can provide for a greater number of subscriptions and corresponding cloud computing services while only a fraction of them will typically be active at the same time.

During the service usage, the service enabler 200 continues to monitor the service subscription in the network 204, as of action 2:4, in order to detect when the subscription becomes de-activated. When detecting that the service subscription is de-activated, e.g. when the terminal connection is released in the network 204 or when a preset time period of the subscription expires, the processing and execution of the cloud computing service in the service subscription is interrupted and the allocated resources in the cloud architecture 202 are released, as indicated in action 2:6, and thus are becoming available for other clients when activating their service subscriptions.

Alternatively, e.g. in the case when the service subscription is a pre-paid service subscription, the cloud computing service in the subscription may be temporarily suspended when detecting that a pre-paid amount for the service subscription has been spent. Thereby, the cloud computing service can be resumed once a new amount has been paid for the service subscription. If no further payment has been made within a preset time limit, the service subscription can be de-activated as above, thus interrupting processing and execution of the cloud computing service and releasing the allocated resources in the cloud architecture 202. This mechanism of controlling the cloud computing service depending on prepayment can be combined with the mechanism of allocating the resources depending on subscription activity. In this case, the service enabler 200 keeps track on both subscription activity and service activity, e.g. by means of a state function illustrated as state diagrams in FIGS. 5 and 6, respectively.

Figure 3:
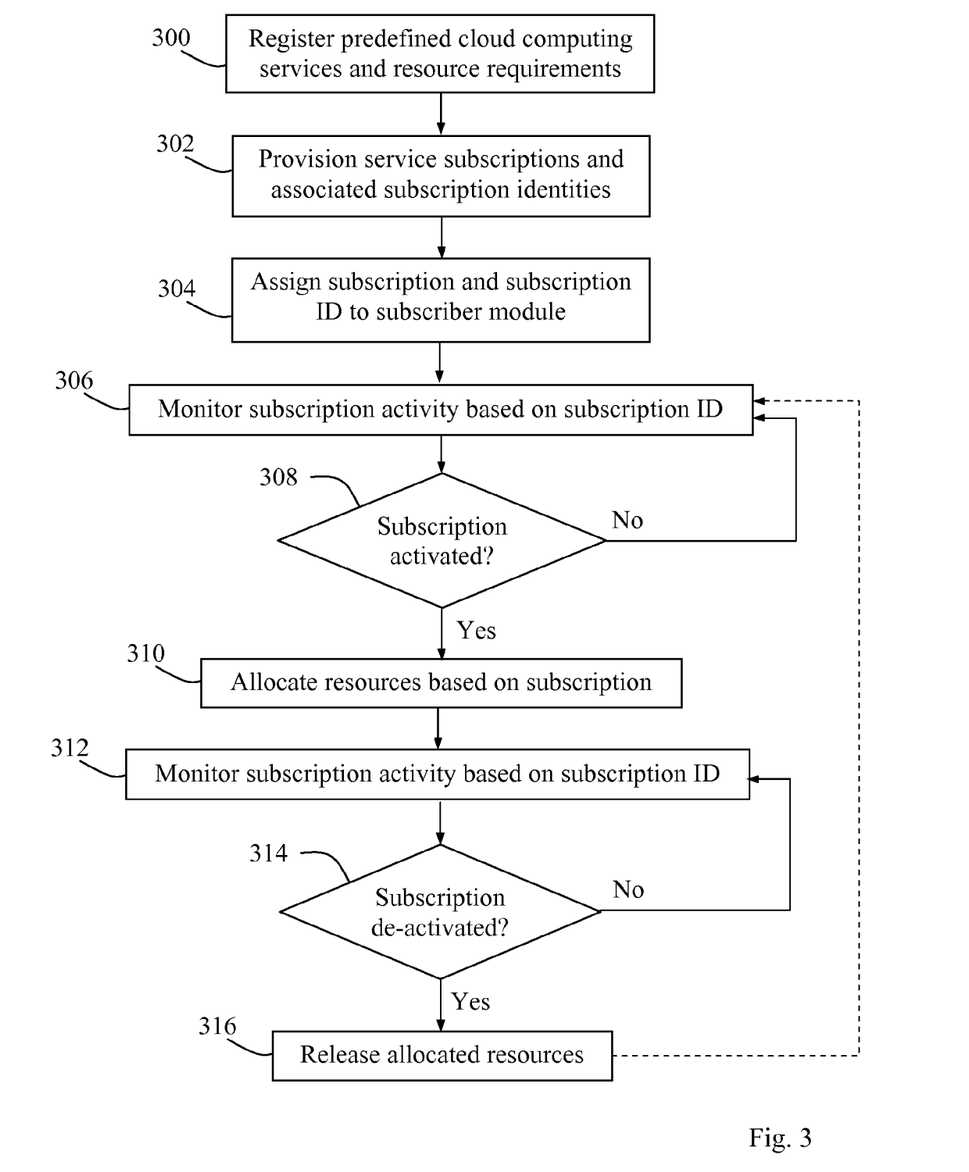
FIG. 3 is a flow chart with actions performed by a service enabler for enabling delivery of an IT-service to a client, according to further example embodiments.

An exemplary procedure in a service enabler of enabling delivery of an IT-service for a client, wherein execution of the IT-service requires resources in a cloud architecture, winnow be described with reference to FIG. 3. In a first action 300, the service enabler registers a plurality of predefined cloud computing services and their respective requirements for resources in the cloud architecture, e.g. as described above for action 2.1. In a next action 302, the service enabler provisions service subscriptions and associated subscription identities for the predefined services, the service subscriptions and subscription identities being valid in a telecommunications network that the client uses, e.g. as described above for action 2.2.

Then, the service enabler assigns one of the predefined service subscriptions, covering a predefined cloud computing service, and the associated subscription identity to an identity module, in a further action 304, for enabling delivery of the IT-service to the client when using the identity module. Action 304 may be performed as described above for action 2:3. The service enabler then monitors activity of the service subscription which can be detected when the identity module is used by the client in the telecommunications network based on the identity of the service subscription, in a further action 306, e.g. as described above for action 2.4.

If it is detected in a following action 308 that the subscription has been activated, e.g. in the manner described above in connection with action 2:5, the service enabler allocates resources in the cloud architecture required for the cloud computing service, according to the monitored service subscription, in a next action 310. Otherwise, the procedure returns to action 306 for continued monitoring. After allocating resources in action 310 when the subscription has been activated, the service enabler continues to monitor activity of the service subscription in the telecommunications network, in a further action 312.

If it is detected in a following action 314 that the subscription has been de-activated, e.g. when the client terminal is powered off or otherwise becomes disconnected from the network or when the subscription expires, the service enabler interrupts the processing and execution of the cloud computing service and releases the allocated resources in the cloud architecture, in a final shown action 316. Otherwise, the procedure returns to action 312 for continued monitoring. After releasing the allocated resources in action 316, the process may return to action 306 for continued monitoring in view of renewed activation of the subscription, as indicated by a dashed arrow.

With reference to the block diagram in FIG. 4, an arrangement in a service enabler 400 configured to enable delivery of an IT-service to a client C, wherein execution of the IT-service requires resources in a cloud architecture 410, will now be described. This arrangement may be implemented as an application or the like in the service enabler. Me service enabler 400 can be configured to basically operate according to any of the examples described above for FIGS. 2 and 3, whenever appropriate.

According to this arrangement, the service enabler 400 comprises a service unit 402 adapted to register a plurality of predefined cloud computing services 402a and their respective requirements for resources in the cloud architecture 410, e.g. in the form of description records. The service enabler 400 also comprises a subscription unit 404 adapted to provision subscriptions 404a and associated subscription identities for the predefined cloud computing services. The service subscriptions and subscription identities are valid in a telecommunications network 408 used by the client C. The subscription unit 404 is further adapted to assign one of the provisioned service subscriptions and associated subscription ID (identity) to an identity module M for enabling delivery of the IT-service to the client C by providing an associated predefined cloud computing service when the identity module M is installed and used in the client C, as indicated by a dashed arrow.

The service enabler 400 also comprises a monitoring unit 406 adapted to monitor activity of the assigned service subscription in the telecommunications network 408, based on the associated identity of the service subscription. A subscription state 404b indicating whether the service subscription is active or inactive, may be maintained in the subscription unit 404 for the identity module M used in the client. The service unit 402 is further adapted to allocate resources in the cloud architecture 410 required for the associated cloud computing service, according to the monitored service subscription when it is detected that the service subscription is activated. The resource allocations 402c may be maintained in the service unit 402 for the identity module M used in the client. Also, a service state 402b, indicating whether the used cloud computing service is active, inactive or suspended, may be maintained for the identity module M in the service unit 402.

The service unit 402 may further comprise repositories 402d and 402e for software and configuration files, respectively, which may have been preloaded in the service enabler 400. As described above, the description records of the predefined cloud computing services 402a may comprise pointers to configuration files in repository 402e such as scripts which automatically configure cloud resources for the services, and pointers to any software files in repository 402d needed to execute the cloud computing services.

The different units in the service enabler 400 may be configured and adapted to provide further optional features and embodiments. In one example embodiment, the monitoring unit 406 is further adapted to detect that the service subscription is activated when the client, using the identity module, connects to the telecommunications network. In the case when the client is a mobile terminal, the monitoring unit 406 may be further adapted to detect the activation of the service subscription when the mobile terminal activates a primary PDP (Packet Data Protocol) context or is attached to the telecommunications network.

In further optional embodiments, the identity module may for example be, without limitation: a SIM (Subscriber Identity Module) card, soft SIM, USIM (UMTS SIM), ISIM (IMS SIM), VSIM (Virtual SIM), MCIM (Machine Communication Identity Module), smart card, or encryption circuit, adapted for installation in the client, while corresponding subscriber data is maintained in a subscription database of the telecommunications network. If the telecommunications network is a mobile network, the identity module may be a SIM card for use in mobile terminals, and the subscription database is an HLR (Home Location Register) or an HSS (Home Subscriber Server) of the mobile network.

The service unit 402 may be further adapted to allocate the resources by identifying the cloud computing service connected to the service subscription assigned to the identity module and determining resource requirements of the identified cloud computing service. In another optional embodiment, the assigned service subscription may be an aggregated subscription valid for a set of clients allowed to utilise the provided cloud computing service when the identity module is installed in a mobile broadband muter or a fixed wireless terminal associated with the set of clients.

The service unit 402 may also be adapted to interrupt the processing such that the allocated resources in the cloud architecture are released, when it is detected that the service subscription is de-activated. If the assigned service subscription is a pre-paid service subscription, the service unit 402 may be further adapted to suspend the provided cloud computing service when it is detected that a pre-paid amount for the service subscription has been spent such that the cloud computing service is resumed when a new amount has been paid for the service subscription.

Figure 4:
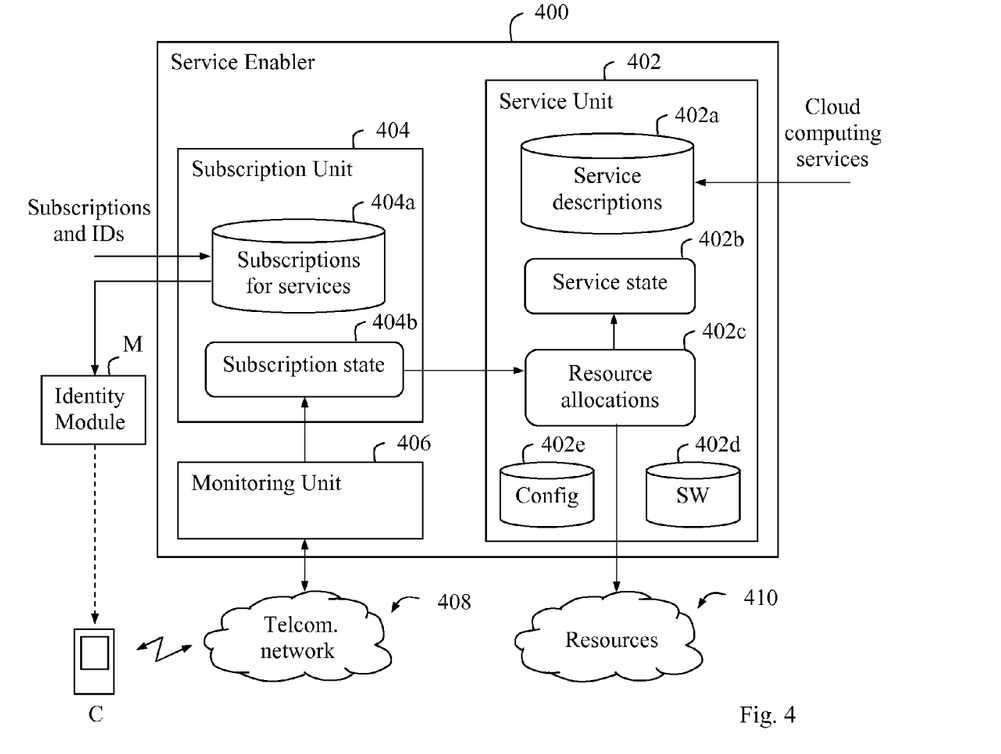
FIG. 4 is a block diagram illustrating in more detail an arrangement in a service enabler, according to another example embodiment

It should be noted that FIG. 4 merely illustrates various functional unit or unit in the service enabler 400 in a logical sense, although the skilled person is free to implement these functions in practice using suitable software and hardware means. Thus, the invention is generally not limited to the shown structures of the service enabler 400, while its functional unit 402, 404 and 406 may be configured to operate according to the features described for FIGS. 2 and 3 above, where appropriate.

The functional unit 402, 404 and 406 described above can be implemented in the service enabler 400 as program modules of a computer program comprising code means which when run by a processor in the service enabler 400 causes the service enabler 400 to perform the above-described functions and actions. The processor may be a single CPU (Central processing unit), or could comprise two or more processing unit. For example, the processor may include general purpose microprocessors, instruction set processors and/or related chips sets and/or special purpose microprocessors such as ASICs (Application Specific Integrated Circuit). The processor may also comprise board memory for caching purposes.

The computer program may be carried by a computer program product in the service enabler 400 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program product in the form of memories within the service enabler 400.

Figure 5:
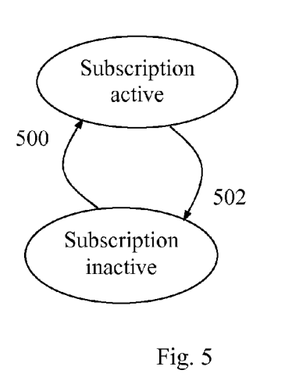
FIGS. 5 and 6 are state diagrams illustrating a client activity state and a service state, respectively.

FIG. 5 illustrates a state diagram maintained in the service enabler 400 for the subscription state 404b, e.g. in the form of a state table with subscription ID and current subscription state. Initially, that is before the client has started to use the purchased identity module, e.g. SIM, with corresponding service subscription and subscription ID, the subscription state is inactive, which changes 500 to active once activation of the subscription is detected, e.g. as described for actions 2:5 and 306-308 above. When de-activation of the subscription is detected, e.g. as described above for action 314, the subscription state changes 502 to inactive.

Figure 6:
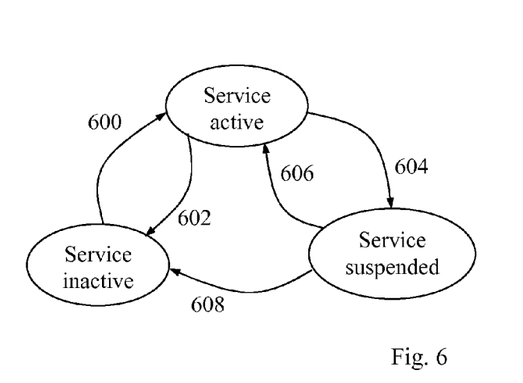

In a similar manner, FIG. 6 illustrates a state diagram for the service state 402b of the used cloud computing service, as maintained in the service unit 404, e.g. in the form of another state table with service identifier and current service state. The service state changes 600 from inactive to active when the client has activated the subscription and can start to use the cloud computing service. A change from inactive to active basically requires full initialization of software and configuration of the cloud computing service.

The service state may change back 602 to inactive when the cloud computing service is interrupted, e.g. as described above for actions 2:6 and 316. Alternatively, e.g. in the case of a prepaid subscription, the service state may change 604 to suspended when the cloud computing service is interrupted and cannot be used by the client. In that case, the resources remain allocated during the suspended state and the software and configuration of the cloud computing service are basically still running. Once it is determined that the client has paid an additional amount for extending the subscription, the service state may change back 606 to active and the cloud computing service can be used again. Otherwise, if no additional payment is made, the service state will eventually change 608 to inactive after a preset timeout period. The service state may thus depend on the type of subscription.

Some exemplary advantages that may be achieved when using the invention according to any of the above-described embodiments, are:

A) A large number of predefined cloud computing services can be sold to many clients to enable various IT-services without requiring costly manual operation for configuring the cloud computing services individually for the clients, since resources are allocated in the cloud only when usage of the cloud computing service can be expected. In this way, only a fraction of the total number of subscribing clients and cloud computing services will be served with resources at the same time.

B) The resources in the cloud architecture are utilized more efficiently as allocated resources are left unused no more than necessary at any give time.

C) It is relatively simple to subscribe to a cloud computing service by purchasing an identity module, and to automatically obtain the needed resources.

D) The identity modules with predefined cloud computing services can be sold at relatively low prices, thereby attracting the more cost-limited clients which opens up a large market.

E) A network operator can sell IT-services to its customers by simply having a contract with a provider of cloud computing services, such that when the clients request for services requiring IT resources they will be able to access the necessary resources in the cloud.

F) This solution can be used for diverse types of subscriptions including those with normal regular payments and pre-paid.

While the invention has been described with reference to specific exemplary embodiments, the description is generally only intended to illustrate the inventive concept and should not be taken as limiting the scope of the invention. For example, the terms "client", "resource", "IT-service", "cloud computing service", "service enabler", "service identifier", "identity module", and "subscription identity" have been used throughout this description, although any other corresponding functions, parameters, nodes and/or units could also be used having the functionalities and characteristics described here. The invention is defined by the appended claims.

The invention claimed is:

1. A method in a service enabler for enabling delivery of an IT-service to a client, wherein execution of the IT-service comprises resources in a cloud architecture, the method comprising:
    registering a plurality of predefined cloud computing services and their respective requirements for resources in the cloud architecture;
    provisioning service subscriptions and associated subscription identities for the predefined cloud computing services, said service subscriptions and subscription identities being valid in a telecommunications network;
    assigning one of said service subscriptions and associated subscription identity to an identity module, for enabling delivery of said IT-service to the client by providing an associated predefined cloud computing service responsive to the client using said identity module;
    monitoring activity of the assigned service subscription in said telecommunications network based on the associated subscription identity; and
    allocating resources in the cloud architecture according to the assigned service subscription, responsive to detecting that the assigned service subscription is activated or has been activated,
    wherein the identity module is installed in a mobile broadband router or a fixed wireless terminal associated with a set of clients, thereby allowing said set of clients to utilise the provided cloud computing service.

2. A method according to claim 1, wherein said monitoring comprises detecting that said service subscription is activated responsive to the client, using said identity module, connecting to said telecommunications network.

3. A method according to claim 2, the client comprising a mobile terminal, wherein said activation of the service subscription is detected responsive to the mobile terminal activating a primary PDP (Packet Data Protocol) context.

4. A method according to claim 1, wherein said identity module comprises at least one of: a SIM (Subscriber Identity Module) card, soft SIM, USIM (UMTS SIM), ISIM (IMS SIM), VSIM (Virtual SIM), MCIM (Machine Communication Identity Module), smart card, and encryption circuit, adapted for installation in the client, and wherein corresponding subscriber data is maintained in a subscription database of the telecommunications network.

5. A method according to claim 4, wherein the telecommunications network is a mobile network, the identity module is a SIM card for use in mobile terminals, and the subscription database is an HLR (Home Location Register) or an HSS (Home Subscriber Server) of the mobile network.

6. A method according to claim 1, wherein said allocating comprises identifying the cloud computing service connected to the service subscription assigned to the identity module, and determining resource requirements of the identified cloud computing service.

7. A method according to claim 1, wherein said assigned service subscription comprises an aggregated subscription.

8. A method according to claim 1, wherein the processing is interrupted and the allocated resources in the cloud architecture are released, responsive to detecting that the service subscription is de-activated.

9. A method according to claim 1, wherein the assigned service subscription comprises a pre-paid service subscription and said provided cloud computing service is suspended responsive to detecting that a pre-paid amount for the service subscription has been spent, and wherein the cloud computing service is resumed responsive to a new amount having been paid for the service subscription.

10. A method according to claim 1,
wherein the assigned service subscription comprises a pre-paid service subscription,
when the cloud computing service changes from an active state to a suspended state, responsive to detecting that a pre-paid amount for the service subscription has been spent,
wherein the cloud computing service changes from the suspended state to an active state, responsive to a new amount having been paid for the service subscription, and
wherein the cloud computing service changes from the active state to an inactive state, responsive to detection of de-activation of the subscription.

11. An arrangement in a service enabler configured to enable delivery of an IT-service to a client, wherein execution of the IT-service requires resources in a cloud architecture, the arrangement in the service enabler comprising:
at least one processor; and
a memory coupled to the at least one processor and comprising computer readable program code that when executed by the at least one processor causes the at least one processor to perform operations comprising:
registering a plurality of predefined cloud computing services and their respective requirements for resources in the cloud architecture;
provisioning service subscriptions and associated subscription identities for the predefined cloud computing services, said service subscriptions and subscription identities being valid in a telecommunications network, and to assign one of said service subscriptions and associated subscription identity to an identity module for enabling delivery of said IT-service to the client by providing an associated predefined cloud computing service responsive to the client using said identity module; and
monitoring activity of the assigned service subscription in said telecommunications network based on the associated subscription identity,
allocating resources in the cloud architecture according to the assigned service subscription responsive to detecting that the assigned service subscription is activated or has been activated, wherein the identity module is installed in a mobile broadband router or a fixed wireless terminal associated with a set of clients, thereby allowing said set of clients to utilise the provided cloud computing service.

12. An arrangement according to claim 11, wherein the operations further comprise detecting that said service subscription is activated responsive to the client, using said identity module, connecting to said telecommunications network.

13. An arrangement according to claim 12, wherein the client comprises a mobile terminal, the operations further comprise detecting said activation of the service subscription responsive to the mobile terminal activating a primary PDP (Packet Data Protocol) context.

14. An arrangement according to claim 11,
wherein said identity module comprises at least one of: a SIM (Subscriber Identity Module) card, soft SIM, USIM (UMTS SIM), ISIM (IMS SIM), VSIM (Virtual SIM), MCIM (Machine Communication Identity Module), smart card, and encryption circuit, adapted for installation in the client, and
wherein corresponding subscriber data is maintained in a subscription database of the telecommunications network.

15. An arrangement according to claim 14, wherein the telecommunications network comprises a mobile network, the identity module comprises a SIM card for use in mobile terminals, and the subscription database comprises an HLR (Home Location Register) or an HSS (Home Subscriber Server) of the mobile network.

16. An arrangement according to claim 11, wherein the operations further comprise allocating the resources by identifying the cloud computing service connected to said service subscription assigned to the identity module and determining resource requirements of the identified cloud computing service.

17. An arrangement according to claim 11, wherein said assigned service subscription comprises an aggregated subscription.

18. An arrangement according to claim 11, wherein the operations further comprise interrupting the processing such that the allocated resources in the cloud architecture are released, responsive to detecting that said service subscription is de-activated.

19. An arrangement according to claim 11, wherein the assigned service subscription comprises a pre-paid service subscription, and wherein the operations further comprise suspending said provided cloud computing service responsive to detecting that a pre-paid amount for the service subscription has been spent, and to resume the cloud computing service responsive to a new amount having been paid for the service subscription.

20. An arrangement according to claim 11, wherein the assigned service subscription comprises a pre-paid service subscription, and wherein the operations further comprise:
changing the cloud computing service from an active state to a suspended state, responsive to detecting that a pre-paid amount for the service subscription has been spent,
changing the cloud computing service from the suspended state to an active state, responsive to a new amount having been paid for the service subscription, and
changing the cloud computing service from the active state to an inactive state, responsive to detection of de-activation of the subscription.

* * * * *